(12) United States Patent
Marshall et al.

(10) Patent No.: US 8,762,596 B2
(45) Date of Patent: *Jun. 24, 2014

(54) DIRECT MEMORY ACCESS CONTROLLER WITH MULTIPLE TRANSACTION FUNCTIONALITY

(75) Inventors: John D. Marshall, Meridian, ID (US); Douglas G. Keithley, Boise, ID (US); William R. Schmidt, Boise, ID (US)

(73) Assignee: Marvell International Ltd. (BM)

( * ) Notice: Subject to any disclaimer, the term of this patent is extended or adjusted under 35 U.S.C. 154(b) by 104 days.

This patent is subject to a terminal disclaimer.

(21) Appl. No.: 13/023,251

(22) Filed: Feb. 8, 2011

(65) Prior Publication Data

US 2011/0131347 A1 Jun. 2, 2011

Related U.S. Application Data

(63) Continuation of application No. 11/821,406, filed on Jun. 22, 2007, now Pat. No. 7,904,614.

(60) Provisional application No. 60/816,663, filed on Jun. 27, 2006.

(51) Int. Cl.
*G06F 13/28* (2006.01)
*G06F 3/00* (2006.01)
*G06F 13/00* (2006.01)

(52) U.S. Cl.
USPC .................................. 710/22; 710/30; 710/33

(58) Field of Classification Search
None
See application file for complete search history.

(56) References Cited

U.S. PATENT DOCUMENTS

| | | | |
|---|---|---|---|
| 4,849,747 A | 7/1989 | Ogawa et al. | 340/735 |
| 5,826,106 A | 10/1998 | Pang | 395/845 |
| 7,143,205 B2* | 11/2006 | Sakugawa | 710/22 |
| 7,310,717 B2* | 12/2007 | Nishino et al. | 711/165 |
| 7,707,324 B1* | 4/2010 | Schmidt et al. | 710/8 |
| 7,904,614 B1* | 3/2011 | Marshall et al. | 710/22 |
| 2002/0026551 A1* | 2/2002 | Kamimaki et al. | 710/260 |
| 2002/0194401 A1* | 12/2002 | Sakugawa | 710/28 |
| 2005/0105549 A1* | 5/2005 | Ishida et al. | 370/463 |
| 2006/0080477 A1 | 4/2006 | Seigneret et al. | 710/22 |
| 2006/0236001 A1* | 10/2006 | Tanabe | 710/22 |
| 2006/0294343 A1 | 12/2006 | Rejmaniak | 712/227 |
| 2007/0162643 A1 | 7/2007 | Tousek | 710/22 |
| 2008/0209084 A1 | 8/2008 | Wang et al. | 710/22 |

OTHER PUBLICATIONS

Intel, 8237A High Performance Programmable DMA Controller (8237A-5), Sep. 1993, Intel.

* cited by examiner

*Primary Examiner* — Kris Rhu

(57) ABSTRACT

A direct memory access controller is set forth. The direct memory access controller includes first and second registers storing various values that are used to set the parameters of DMA transfers that take place during a single data transaction. The first register stores a start address location value used to define a start address at which direct memory access transfers for the transaction are to begin. The second register stores a value used to end data transfers of the data transaction. The DMA controller also includes transfer control circuitry for executing the data transaction. The transfer control circuitry is adapted to automatically execute multiple, consecutive data transactions using the values stored in the first and second registers.

20 Claims, 10 Drawing Sheets

DIRECT MEMORY ACCESS CONTROLLER WITH MULTIPLE TRANSACTION FUNCTIONALITY

CROSS-REFERENCE TO RELATED APPLICATION

This application is a continuation of U.S. application Ser. No. 11/821,406, filed Jun. 22, 2007, which claims the benefit of U.S. Provisional Application No. 60/816,663, filed Jun. 27, 2006, which are both hereby incorporated by reference.

BACKGROUND

In microprocessor based system designs, the processor, one or more I/O devices, and the system memory often share a common system bus. Accordingly, communication between the system components takes place over the common system bus. There are a number of different ways in which such communications may take place. However, in each instance, the microprocessor transfers data between the various components on the system bus under the control of application programs.

The manner in which the microprocessor is allowed to handle data transfers varies with the system design. In many systems, direct memory access (DMA) controllers may be employed to significantly reduce involvement of the microprocessor in the data transfer operations and thereby increase data transfer throughput. In a DMA transfer, the microprocessor programs the DMA controller with the source and destination addresses as well as the length of the data block that is to be transferred. The microprocessor then relinquishes control of the system bus to the DMA controller, which drives the system bus and generates the control signals to perform the data transfer. The DMA controller directs the reading of the data from the source address during, for example, a first clock cycle, and directs the writing of the data to the destination address during, for example, a second clock cycle. After each word of data is transferred, the source and destination addresses are automatically incremented (or decremented), and the value for the length of the data block is decremented. The data transfer operation then is repeated for the next word. The DMA controller ceases data transfer operations in response to an underflow of the value for the length of the data block. The DMA controller generates an interrupt to the microprocessor once all data transfers of the data transaction have been completed.

Although the DMA data transfer method reduces the need for intervention of the microprocessor in various data transfer operations, it still requires the microprocessor to set up each data transaction. Further, the microprocessor must perform an interrupt service routine upon completion of each data transaction. These operations still may place a significant burden on the microprocessor.

SUMMARY

The present invention is defined by the following claims, and nothing in this section should be taken as a limitation on those claims.

By way of introduction, the preferred embodiments described below provide a direct memory access controller having first and second registers storing various values that are used to set the parameters of a data transaction. The first register stores a start address location value used to define a start address at which direct memory access transfers are to begin. The second register stores a value used to end data transfers of the data transaction. The DMA controller also includes transfer control circuitry for executing the data transaction using the values in the first and second registers. The transfer control circuitry is adapted to automatically execute multiple, consecutive data transactions using the values stored in the first and second registers.

In one preferred embodiment, the second register holds a transfer count value that is decremented with each data transfer until the occurrence of an underflow condition of the transfer count value. In another preferred embodiment, the second register holds an end address location value at which DMA transfers are to be terminated. Other preferred embodiments are provided, and each of the preferred embodiments described herein can be used alone or in combination with one another.

The preferred embodiments will now be described with reference to the attached drawings.

DETAILED DESCRIPTION OF THE PRESENTLY PREFERRED EMBODIMENTS

Figure 1:
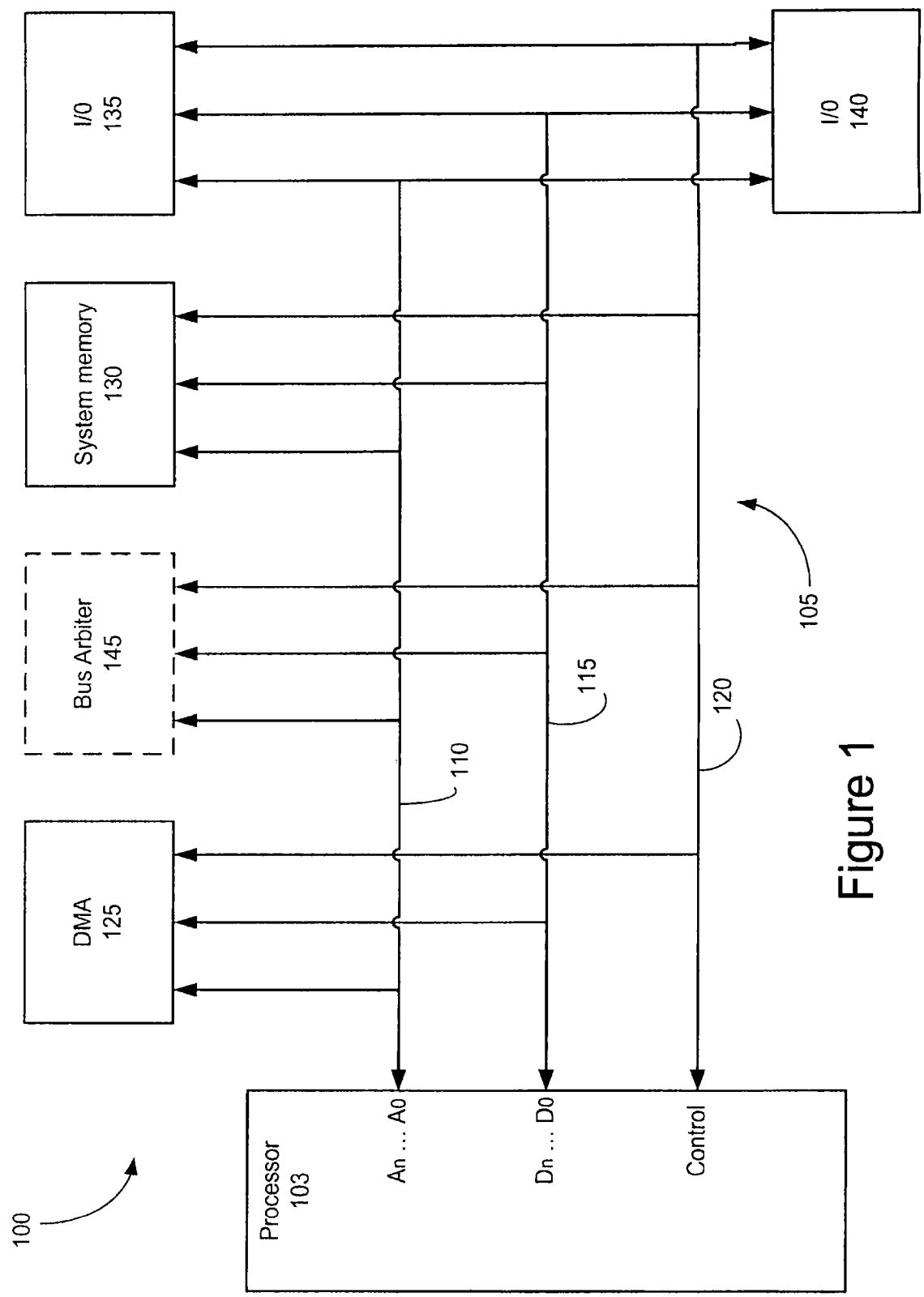
FIG. 1 is a block diagram of a microprocessor-based system employing a DMA controller having multiple transaction capability.

FIG. 1 is a block diagram of a microprocessor based system 100 employing a plurality of components that are interconnected with a processor 103 over a system bus 105. System bus 105 includes an address bus 110 having address lines $A_n$ through $A_0$, a data bus 115 having data lines $D_n$ through $D_0$, and a control bus 120 having a number of different control lines. The components on the system bus 105 include a DMA controller 125, system memory 130, and multiple I/O devices 135 and 140. System memory 130 may include read only memory as well as random access memory storage. I/O devices 135 and 140, for example, may comprise, without limitation, a disk drive (floppy, optical, hard disk, etc.), a printer, a human interface device, a sensor, or the like. Depending on the complexity of the system 100, a bus arbiter 145 also may be employed. For the sake of simplicity, other components often used to facilitate operation of the system 100 have not been included in FIG. 1.

The processor 103 executes code that, for example, is stored in system memory 130. This code includes routines that may be executed to program the DMA controller 125 for data transfer operations. In the illustrated system, the DMA controller 125 may be programmed to execute multiple data transactions, each comprising one or more data transfers. A number of different values may be used by the DMA controller 125 in the data transaction and data transfer operations. For example, the DMA controller 125 may be programmed with a start address location value used to define a start address at which DMA transfers for a data transaction are to begin and a further value used to end DMA data transfers of the data transaction. In one example, the further value corresponds to an end address location value at which DMA data transfers for a data transaction are to cease. In another example, the further value corresponds to a number of data transfers that are to be executed in the data transaction.

The DMA controller 125 also may be provided with a jump index value. Upon completion of a data transaction, the further value and/or the start address location value may be changed by an amount corresponding to the jump index value. Additionally, an automatic initialization of the DMA controller 125 may take place and another data transaction may be executed using the changed value(s).

A transaction value also may be provided to the DMA controller 125. The transaction value may be used by the DMA controller 125 to limit the number of data transactions that are executed by the DMA controller 125. In one implementation, the transaction value may correspond to a memory address value beyond which further data transactions are inhibited. In another implementation, the transaction value may correspond to a transaction count corresponding to the number of data transactions that are to be executed by the DMA controller 125.

The DMA controller 125 may include multiple DMA channels. Each channel, in turn, may have a corresponding DMA request signal line (DRQ) and DMA acknowledge signal line (DACK). Additional signals that may be used by the DMA controller 125 include a hold request signal (HRQ), a hold acknowledge signal (HLDA), an end of process signal (EOP). Signals used to access I/O devices and memory, such as a memory read signal (MEMR), memory write signal (MEMW), I/O read signal (IOR), and I/O write signal (IOW), may also be employed. All such signals may be included on the control bus 120.

A data transfer on a DMA channel may be initiated when the hardware that uses the DMA channel requests a transfer. For example, I/O device 135 may initiate a DMA transfer to system memory 130 by asserting the DRQ line with which it is associated. The DMA controller 125 will note the asserted signal and verify that the processor 103 has programmed the channel and that DMA transfers on the channel are enabled. The DMA controller 125 and processor 103 then cooperate with one another using the HLDR and HLDA signal lines to provide the DMA controller 125 with control of the system bus 105. In some systems, this operation may be facilitated by bus arbiter 145.

Once the DMA controller 125 has control over the system bus 105, it activates its MEMR, MEMW, IOR, IOW, and address lines to direct the transfer to a specific location in system memory 130. At this point, I/O device 135 places the data that is to be transferred on data lines 115. The DMA controller 125 waits for one DMA clock cycle before deactivating its MEMR, MEMW, IOR, IOW, thereby allowing system memory 130 to store the data provided on data lines 115 from the I/O device 135. If the DMA channel has been programmed by the processor 103 for block or demand transfers, the foregoing process will be repeated until the data transaction is complete. Once the programmed DMA transactions have been completed, the DMA controller 125 and the processor 103 cooperate with one another using the HLDR and HLDA signal lines to restore the processor 103 with control of the system bus 105.

Figure 2:
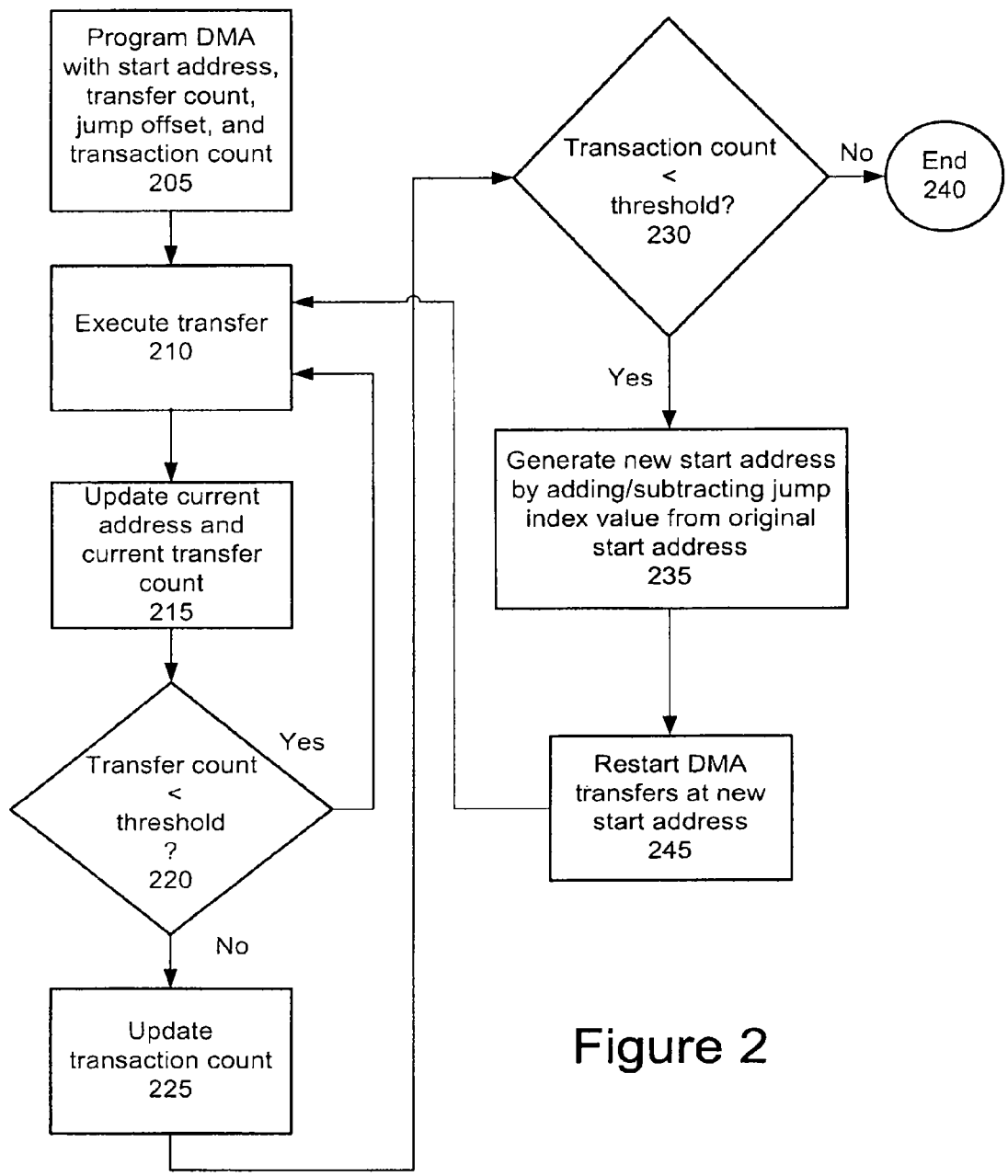
FIG. 2 is a flowchart showing a plurality of interrelated operations that may be executed by the system of FIG. 1 pursuant to conducting one or more DMA transactions.

FIG. 2 is a flowchart showing a plurality of interrelated operations that may be executed by system 100. At block 205, the processor 103 programs a given DMA channel of controller 125 with a start address value, a transfer count value, a jump index value, and a transaction count value. A data transfer using the programmed values is executed at block 210. Once the data transfer has been executed, the DMA controller 125 updates the current address and current transfer count at block 215. This update may be implemented by incrementing or decrementing the current address value by a given amount to correspond to the location for the next data transfer and decrementing the current transfer count to reflect execution of the transfer. A check is made at block 220 to determine whether the current transfer count is less than a threshold value. For example, the current transfer count may be checked for an underflow condition, which indicates the occurrence of a terminal count. If the transfer count has not reached the threshold at block 220, the programmed data transaction includes further data transfers. Therefore, control returns to block 210 for another data transfer operation. The operations of blocks 210 through 220 are repeated until the current transfer count reflects completion of the data transaction.

Upon completion of the data transaction, the transaction count value is updated at block 225. To this end, the transaction count value may be decremented to reflect completion of each data transaction. The updated transaction count value is compared to a threshold value at block 230. This comparison may involve a check of the current transaction count value for an underflow condition. If less than all data transactions have been completed as determined at block 230, a new start address value is generated for the next data transaction at block 235. The new start address value may be generated by adding or subtracting the jump index value from the original start address value. Whether the jump index value is added or subtracted from the original start address value may be a programmable parameter of the DMA controller 125. At block 245, the DMA controller 125 executes a restart operation involving, for example, initialization of the transfer count value to its original value. DMA data transfers using the updated start address value start again at block 210.

Once all data transactions have been completed as determined at block 230, the programmed operations for the channel are at an end, as shown at block 240. At block 240, the DMA controller 125 may inhibit further DMA transfers on the channel until the channel is reprogrammed by the processor 103. Alternatively, the DMA controller 125 may execute an autoinitialization sequence in which the internal registers defining the bounds of the DMA transactions are reset to the original values used by the processor 103 to program the channel. In the latter instance, the DMA controller 125 is automatically ready for the next set of data transactions without the intervention of the processor 103.

Figure 3:
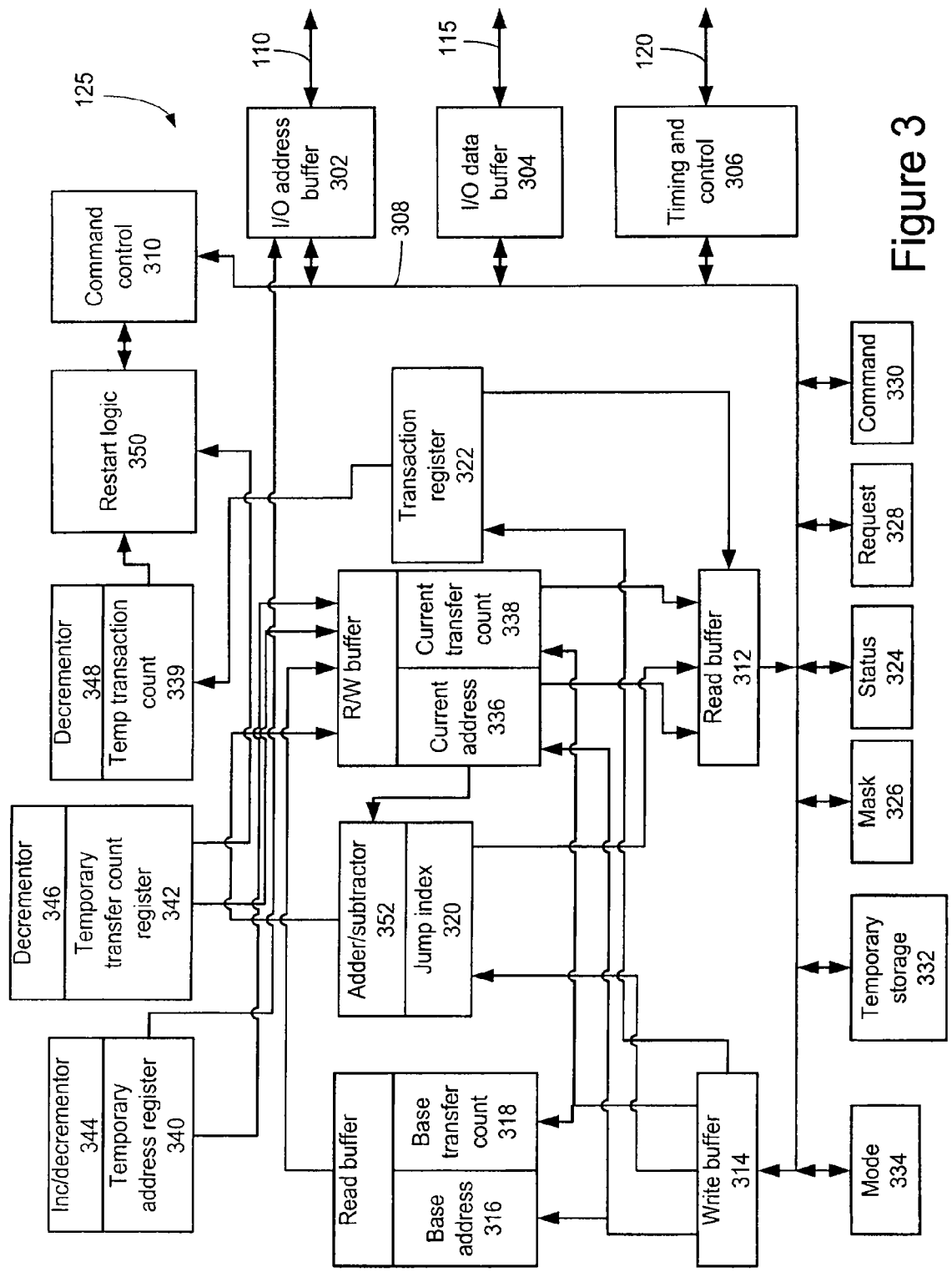
FIG. 3 is a schematic block diagram illustrating one manner of implementing the DMA controller shown in FIG. 1.

FIG. 3 is a schematic block diagram illustrating one manner of implementing the DMA controller 125. In this embodiment, the DMA controller 125 includes an I/O address buffer 302 that provides an interface with address lines 110, an I/O data buffer 304 that provides an interface with data lines 115, and a timing and control interface 306 that provides an interface with control lines 120. Buffers 302 and 304 and interface 306 are connected to an internal bus 308. A read buffer 312 and write buffer 314 facilitate access to various registers within the DMA controller 125 via the internal bus 308.

The processor 103 may place the DMA controller 125 in a programming mode using signals on lines 110, 115, and/or 120. In the programming mode, parameters that are to be used in a DMA transfer are received over the system bus 105 and written to various registers. Reading and writing of the registers may be placed under control of command control logic 310. The embodiment of the DMA controller 125 shown in FIG. 3 includes a base address register 316, a base transfer count register 318, a jump index register 320, and a transaction register 322. The base address register 316 stores a start address location value that is used to define a starting location at which DMA transfers are to begin. The base transfer count register 318 is used to store a count value corresponding to the number of data transfers that are to take place during a data transaction. The jump index register 320 is used to store a value that is used to change the address range of a new data transaction upon completion of a prior data transaction. The transaction register 322 is used to store a value corresponding to the number of data transactions that are to be executed by the DMA controller 125. The DMA controller 125 may have multiple DMA channels, each having a corresponding set of registers 316 through 320.

Additional registers are also illustrated in FIG. 3. For example, a status register 324 may be employed to store status information relating to each channel of the DMA controller 125. Such information may include an identification of the channels that have reached a terminal count and which channels have pending DMA requests. A mask register 326 may be used to enable and/or disable DMA transfers on a particular DMA channel. Software DMA requests may be initiated using request register 328. Command register 330 is used in the programming mode of the DMA controller 125 to store commands received from the processor 103. Temporary storage 332 may be used by the DMA controller 125 to store data during memory-to-memory DMA transfers and/or for temporary storage of initial register values.

The bits of mode register 334 may be used by the processor 103 to set the operational characteristics of the DMA transfers and DMA transactions that take place on a given channel. For example, one or more bits in mode register 334 may be used to determine whether the DMA controller 125 increments or decrements the current address value, current transfer count value, and/or transaction register values during execution of the DMA transactions. Further, one or more bits in mode register 334 may be used to set the type of DMA transfer that is to take place on a given channel. Exemplary DMA transfer types include single transfer mode, block transfer mode, demand transfer mode, cascade mode, memory-to-memory mode, and the like. Additionally, one or more bits in mode register 334 may be used to set the manner in which the DMA controller 125 prioritizes DMA requests and transfers on different DMA channels.

Several different values are initialized in the DMA controller 125 through processor programming and/or autoinitialization operations. When the base address value is written to the base address register 316, the value is also written to a current address register 336. Similarly, the value written to the base transfer count register 318 is also written to a current transfer count register 338. Likewise, the value written to transaction register 322 is written to a temporary transaction count register 339. The value of the current address register 336 is also provided to a temporary address register 340, while the value of the current transfer count register 338 is provided to a temporary transfer count register 342. Although not shown in FIG. 3, the value of the temporary transaction count register 339 also may be made available over the internal bus 308.

During DMA data transfers, the address location value found in the temporary address register 340 is used to direct the data on data lines 115 to the appropriate location in system 100. As each data transfer is completed, an incrementor and/or decrementor circuit 344 updates the value in the temporary address register 340 to the next location at which the next DMA transfer is to take place. The updated address location value is written to current address register 336. However, the value in base address register 316 remains unaltered. Similarly, decrementor 346 updates the count value in temporary transfer count register 342 to reflect the completion of the transfer. The updated count value is written to current transfer count register 338. However, the value in base transfer count register 318 remains unaltered.

When all data transfers for a data transaction have been completed, as indicated by, for example, an underflow condition of temporary transfer count register 342, decrementor 348 updates the value in the temporary transaction count register 339 to reflect the completion of a data transaction. If further data transactions are to be executed, restart logic 350 reinitializes current transfer count register 338 and temporary transfer count register 342 with the value found in the base transfer count register 318. Additionally, an adder and/or subtractor circuit 352 is used to increment or decrement the value of the current address register 336 by an amount corresponding to the value stored in the jump index register 320 to generate a new start address memory location value for the next data transaction. In an alternative embodiment, the value in the base address register 316 may be changed to generate the new start address memory location value. The foregoing operations continue until the temporary transaction count 339 reflects a completion of all programmed data transactions. Subsequently, the DMA controller 125 may be autoinitialized in the manner described above in connection with FIG. 2.

Figure 4:
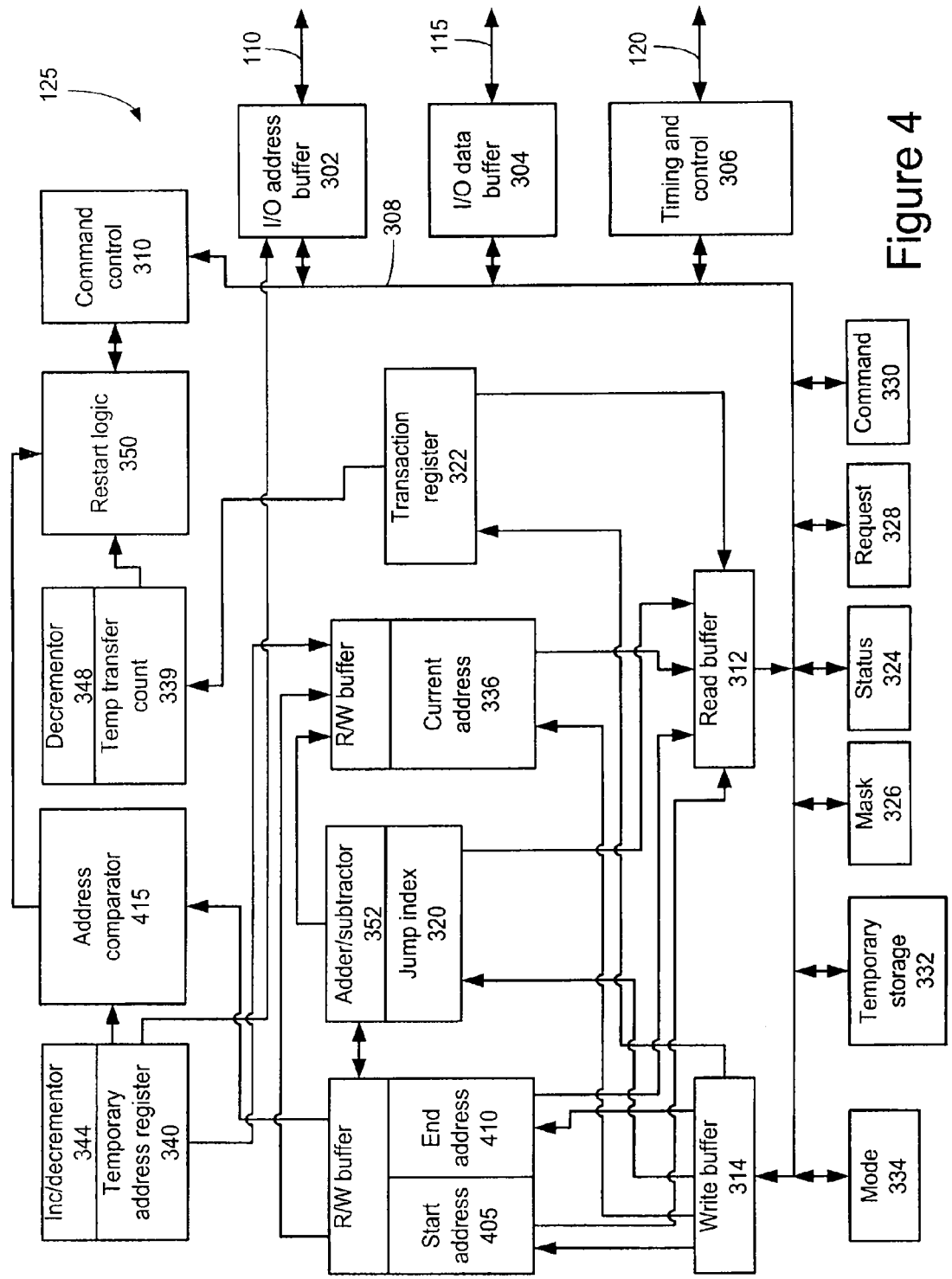
FIG. 4 is a schematic block diagram illustrating a further manner of implementing the DMA controller shown in FIG. 1.

FIG. 4 is a schematic block diagram of a further manner in which the DMA controller 125 may be implemented. The construction shown in FIG. 4 is similar to the construction shown in FIG. 3 and, accordingly, has been labeled with corresponding reference numerals.

In this embodiment, a start address register 405 is programmed with a value corresponding to a start location at which DMA transactions are to begin. An end address register 410 is programmed with an end location at which DMA transactions are to terminate. Jump index register 320 and transaction register 322 are programmed with the jump index value and transaction count value, respectively.

When DMA transfers are to begin, the start address location value may be found in temporary address register 340. With each data transfer, the updated value in the temporary address register 340 is compared with the end address location value of the end address register 410 to determine whether all data transfers for the data transaction have been completed. All data transfers for the data transaction may be assumed to have been completed, for example, when the end address location value of the end address register 410 and the value of the temporary address register are the same. To this end, the end address location value and the value of the temporary address register are provided to an address comparator 415 that indicates completion of the data transfers of a transaction to restart control logic 350. Restart control logic 350 reinitializes the DMA controller 125 for execution of another data transaction provided the value of the temporary transaction count register 339 indicates further transactions are to be performed. Pursuant to the reinitialization process, the adder/subtractor circuit 352 updates the location values in one or both of the start address register 405 and/or end address register 410 by an amount corresponding to the value of the jump index register 320. If autoinitialization is to be implemented in this embodiment, the original values for the start address location, end address location, and transaction count may be stored in corresponding registers and/or temporary storage 332.

Figure 5:
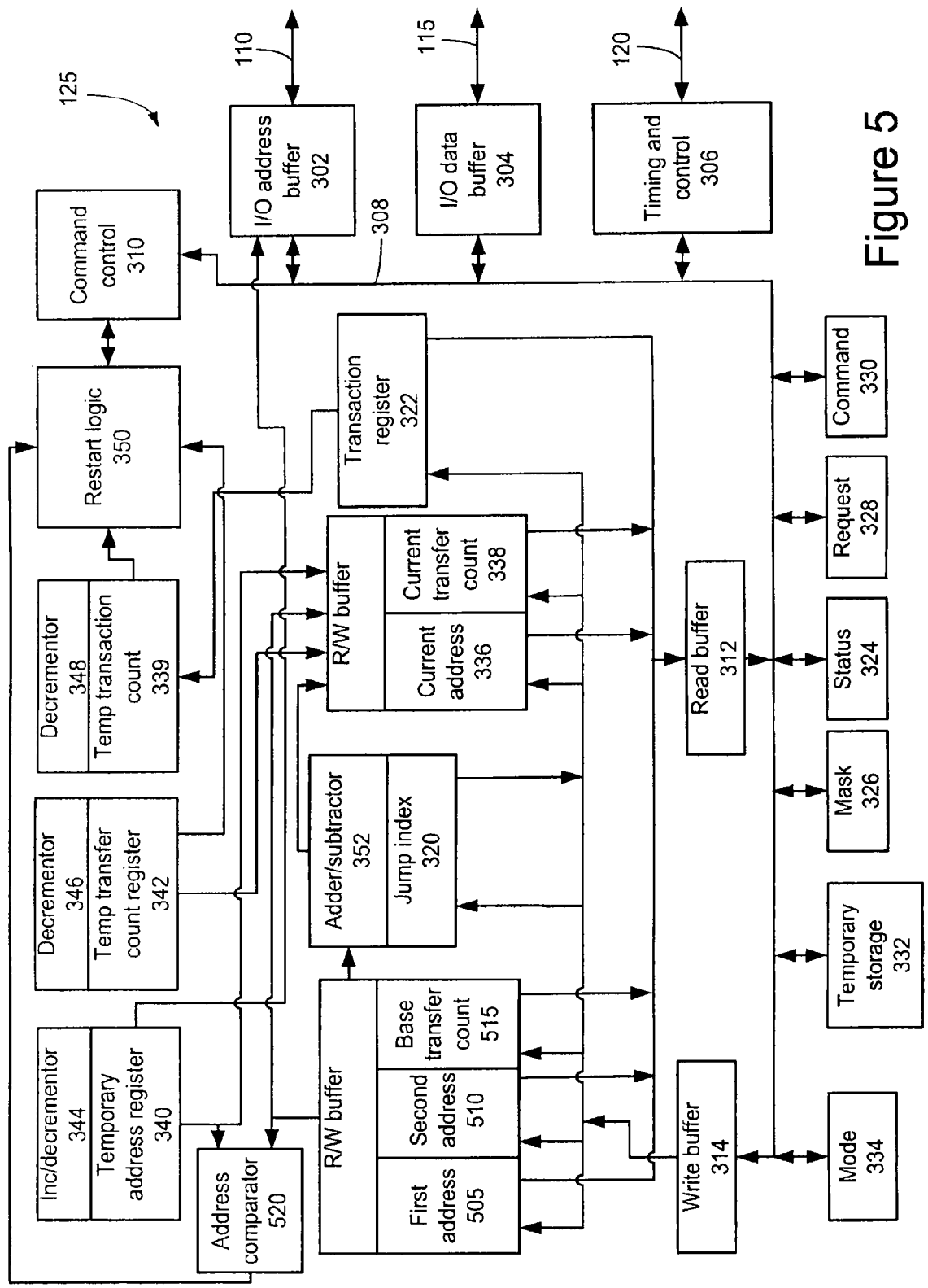
FIG. 5 is a schematic block diagram illustrating a still further manner of implementing the DMA controller shown in FIG. 1.

FIG. 5 is a schematic block diagram of a still further manner in which the DMA controller 125 may be implemented. The construction shown in FIG. 5 is similar to the construction shown in FIG. 3 and, accordingly, has been labeled with corresponding reference numerals.

In this embodiment, a first address register 505 is programmed with a value corresponding to a start location at which DMA transactions are to begin and a second address register 510 is programmed with an end location at which DMA transactions are to terminate. Jump index register 320 and transaction register 322 are programmed with the jump index value and transaction count value, respectively. Additionally, base transfer count register 515 is programmed with a value corresponding to the number of data transfers that are to be executed during a transaction.

When DMA transfers are to begin, the start address location value may be found in temporary address register 340. With each data transfer, the updated value in the temporary address register 340 is compared with the address location value of the second address register 510 to determine whether all data transfers for the data transaction have been completed. Data transfers for the data transaction may be assumed to have been completed when at least one selected criterion is met. For example, all data transfers for the data transaction may be assumed to have been completed when the address location value of the end address register 510 and the value of the temporary address register 340 are the same. To this end, the end address location value and the value of the temporary address register 340 are provided to an address comparator 520 that indicates completion of the data transfers of a transaction to restart control logic 350. All data transfers for the data transaction also may be assumed to have been completed when the value in the temporary transfer count register 342 reaches a threshold value, such as occurs in an underflow condition. In each instance, restart control logic 350 reinitializes the DMA controller 125 for execution of another data transaction provided the value of the temporary transaction count register 339 indicates further transactions are to be performed. Pursuant to the reinitialization process, the adder/subtractor circuit 352 updates the location value of the first address register 505. If autoinitialization is to be implemented in this embodiment, the original values for the start address location, end address location, transfer count, and transaction count may be stored in corresponding registers and/or temporary storage 332.

Through judicious selection of the values stored in the first address register 505, second address register 510, base transfer count register 515, jump index register 320, and transaction register 322, the DMA controller 125 may be programmed to execute DMA transactions in which data is transferred to non-contiguous system location regions. For example, the DMA controller 125 may be programmed to execute transfers to non-contiguous system regions located between the values in the first address register 505 and second address register 510. The number of locations to which data is transferred in each non-contiguous system region corresponds to the value of the base transfer count register 515 while the separation between each non-contiguous system region corresponds to the value of the jump index register 320.

Figure 6:
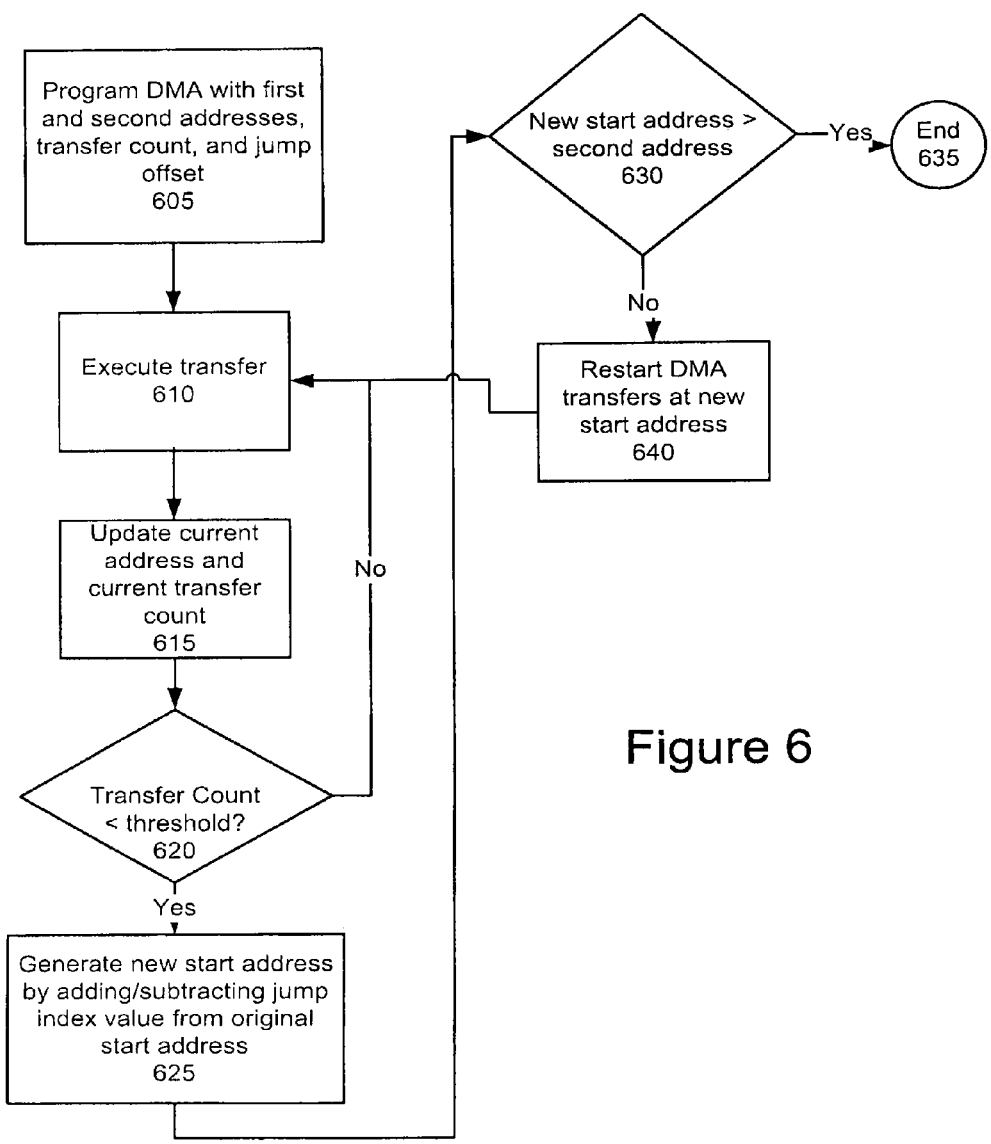
FIG. 6 is a flowchart illustrating a plurality of interrelated operations that may be executed by the DMA controller shown in FIG. 5.

Another manner of operating the embodiment of the DMA controller 125 shown in FIG. 5 is illustrated in the flow chart of FIG. 6. At block 605, the DMA controller 125 is programmed with the values for the first and second addresses, the transfer count, and the jump index. A data transfer using the values is executed at block 610. The current address and current transfer count are updated at block 615. A check of the current transfer count is made at block 620 to determine whether all data transfers of the transaction have been completed. If they have not been completed, another data transfer is executed at block 610 using the updated address value. These operations continue until the current transfer count reflects completion of all data transfers for the data transaction.

At block 625 a new start address is generated for storage in the first address register 505 by adding or subtracting the value of the jump index from the original start address value that was originally stored in the first address register 505. The new start address value is compared to the end address value stored in the second address register 510 to determine whether the next transaction extends beyond the permitted transaction range as defined by the value in the second address register 510. An exemplary comparison is shown at block 630 in which completion of all DMA transfers is assumed when the new start address value is greater than the value stored in the second address register 510. If the new start address value exceeds the permitted range of the data transfer operations, DMA transfers cease at block 635. Otherwise, a restart operation is executed at block 640 and the DMA transfers for the next data transaction are executed at block 610 using the new start address.

Figure 7:
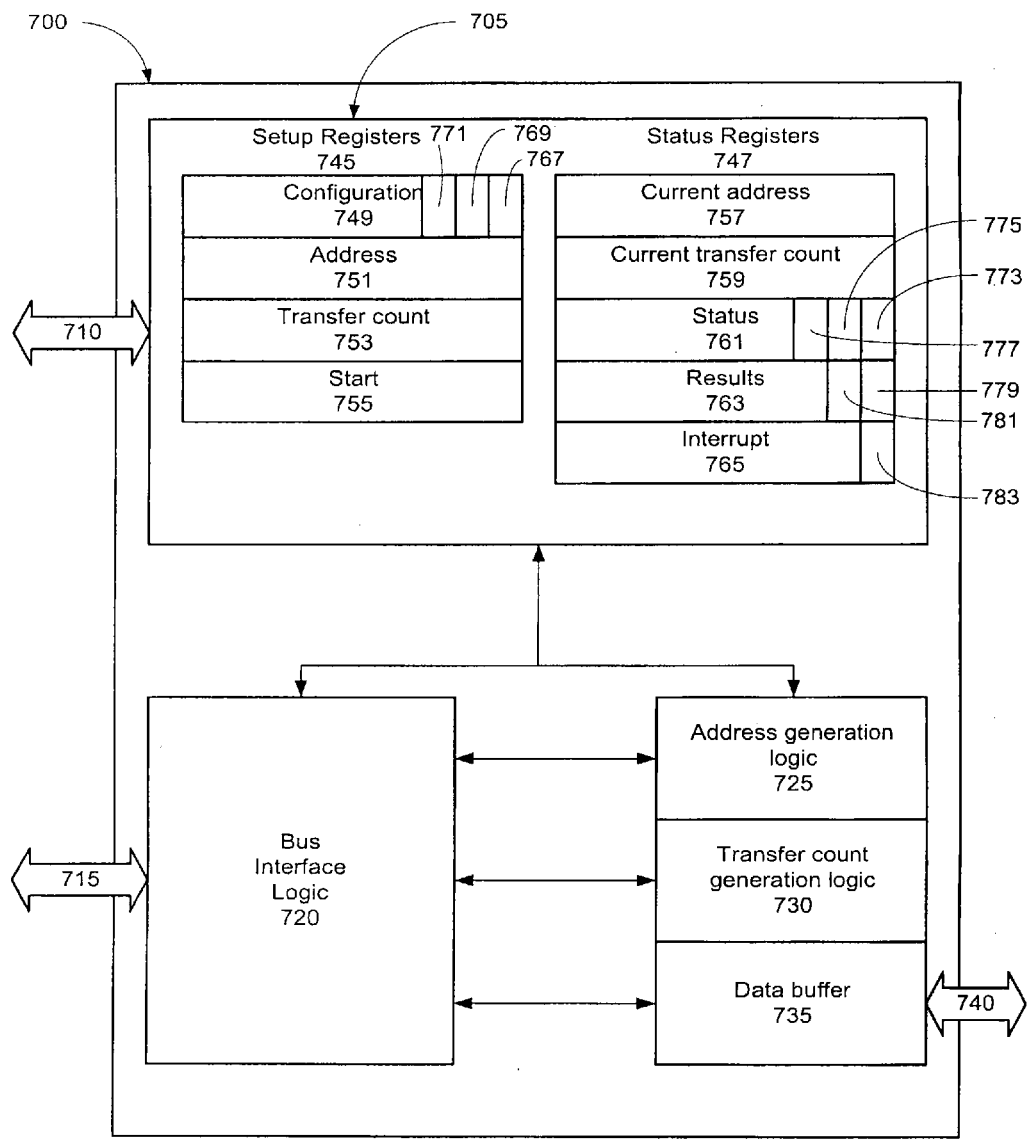
FIG. 7 is a schematic block diagram illustrating another manner of implementing a DMA controller having multiple transaction capability.

FIG. 7 is a schematic block diagram of a further embodiment of a DMA controller 700 that is capable of executing multiple transactions. Although the DMA controller 700 may be used in connection with a variety of different bus architectures, the illustrated embodiment is shown implemented with respect to an Ansible bus. As shown, the DMA controller 700 may include memory storage 705 that is accessible to an Ansible Target bus 710. The DMA controller 700 is accessible over an Ansible Initiator bus 715 through bus interface logic circuitry 720. The bus interface logic circuitry 720, in turn, is connected for internal access of the memory storage 705, address generation logic circuitry 725, transfer count generation logic circuitry 730, and one or more data buffers 735. Data stored in the data buffer(s) 735 may be accessed from the DMA controller 700 over a data bus 740.

The memory storage 705 may include a plurality of setup registers 745 and a plurality of status registers 747. In FIG. 7, the setup registers 745 include configuration register 749, address register 751, transfer count register 753, and start register 755. These registers are programmable and are used to set the operating parameters for the DMA controller 700. The status registers 747 include a current address register 757, a current transfer count register 759, a status register 761, a results register 763, and an interrupt register 765. These registers may be accessed externally and include information indicative of the current operational state of the DMA controller 700.

The configuration register 749 includes a plurality of programmable bits that determine how the DMA controller 700 will operate. To this end, one or more bits 767 may be used to enable and disable the DMA engine. Further, the configuration registers 749 may include one or more bits 769 that may be written to from an external device to initiate a soft reset. Directing the DMA controller 700 to execute a soft reset operation will cause the DMA controller 700 to shut down and discard unprocessed buffer data. Further, one or more bits 771 of the configuration registers 749 may be used to enable and disable the generation of an interrupt by the DMA controller 700 upon completion of each data transaction. When the interrupt is enabled, the DMA controller 700 will generate an interrupt to an external device indicating that a transaction has been completed. When the interrupt is disabled, the DMA controller 700 will continuously execute consecutive, multiple programmed data transaction until directed to do otherwise through, for example, a soft reset or disabling of the DMA engine using the bit(s) 767.

The address register 751 and transfer count register 753 are used to set the operational parameters associated with the execution of a single data transaction by the DMA controller 700. The address register 751 is programmed with the starting address of the source from which data is to be accessed during execution of the direct memory access operation. The transfer count register 753 is programmed with a value corresponding to the total number of data transfers that are to take place during a single data transaction.

The start register 755 is used to initiate direct memory access operations. Operations will start when a write operation is executed to this register. This register should be written only after the configuration register 749, address register 751, and transfer count register 753 have been programmed with the desired values.

With reference to the status registers 747, the current address register 757 may be read to return the source address location that the DMA controller 700 is currently accessing while the current transfer count register 759 may be read to return the number of bytes left in the current data transaction. Status register 761 may include one or more bits 773 indicating whether the direct memory access operations are active or inactive. Bit(s) 773 may be checked before writing data to any of the setup registers 745 to ensure that DMA controller 700 is ready for programming. When bit(s) 773 indicates an active state, direct memory access operations are active or have not yet returned to an idle state. When indicative of an inactive state, the DMA controller 700 is quiescent. Status register 761 also may include one or more bits 775 indicating that the DMA controller 700 has generated an interrupt.

The information contained in the results register 763 is valid when bit(s) 775 of the status register 761 is asserted. One or more bits 779 of the results register 763 may be used to indicate the reason for the interrupt. For example, bit(s) 779 may be asserted when the direct memory access operation was terminated by hardware or firmware through, for example, a soft reset or the like. Similarly, one or more bits 779 may be asserted when the direct memory access operation was terminated by an interrupt generated upon completion of a direct memory access transaction. A plurality of bits 781 of the results register 763 may be used to indicate the number of bytes that were actually transferred prior to termination of the direct memory access operation.

One or more bits 777 of the status register 761 may be used to indicate whether or not the DMA controller 700 is ready for programming. For example, bit(s) 777 may be asserted when the DMA controller 700 is ready to accept data in the address register 751, transfer count register 753, and configuration register 749. If left unasserted, bit(s) 777 indicate that one or more of the registers 749, 751, and 753 are in use and, therefore, are unable to accept new data transaction parameters.

During direct memory access operations, the address generation logic 725 initiates access of the source data over bus lines 715 through bus interface logic 720. The address generation logic 725 starts accessing the source data at the location identified by the address register 751 and updates the current address register 757 as the direct memory access operations of the data transaction proceed. Similarly, the transfer count generation logic circuit 730 updates the current transfer count register 759 until the total number of transfers programmed into the transfer count register 753 for the data transaction have been completed. Data received from the source is stored in data buffer 735 for access over data lines 740.

Once the transfer count generation logic 730 indicates that all transfers have been completed for the programmed data transaction, the firmware and/or hardware associated with the address generation logic 725 and transfer count generation logic 730 may cause the programmed transaction to automatically repeat. Such automatic transaction repetition may occur, for example, when the DMA controller 700 has been programmed without enabling the DMA interrupt bit(s) 771 of configuration register 749. Automatic transaction repetition may continue until the transaction is stopped by, for example, the occurrence of a soft reset, hard reset, external interrupt, software generated interrupt, disabling of the DMA engine through the configuration register 749, or the like.

Figure 8:
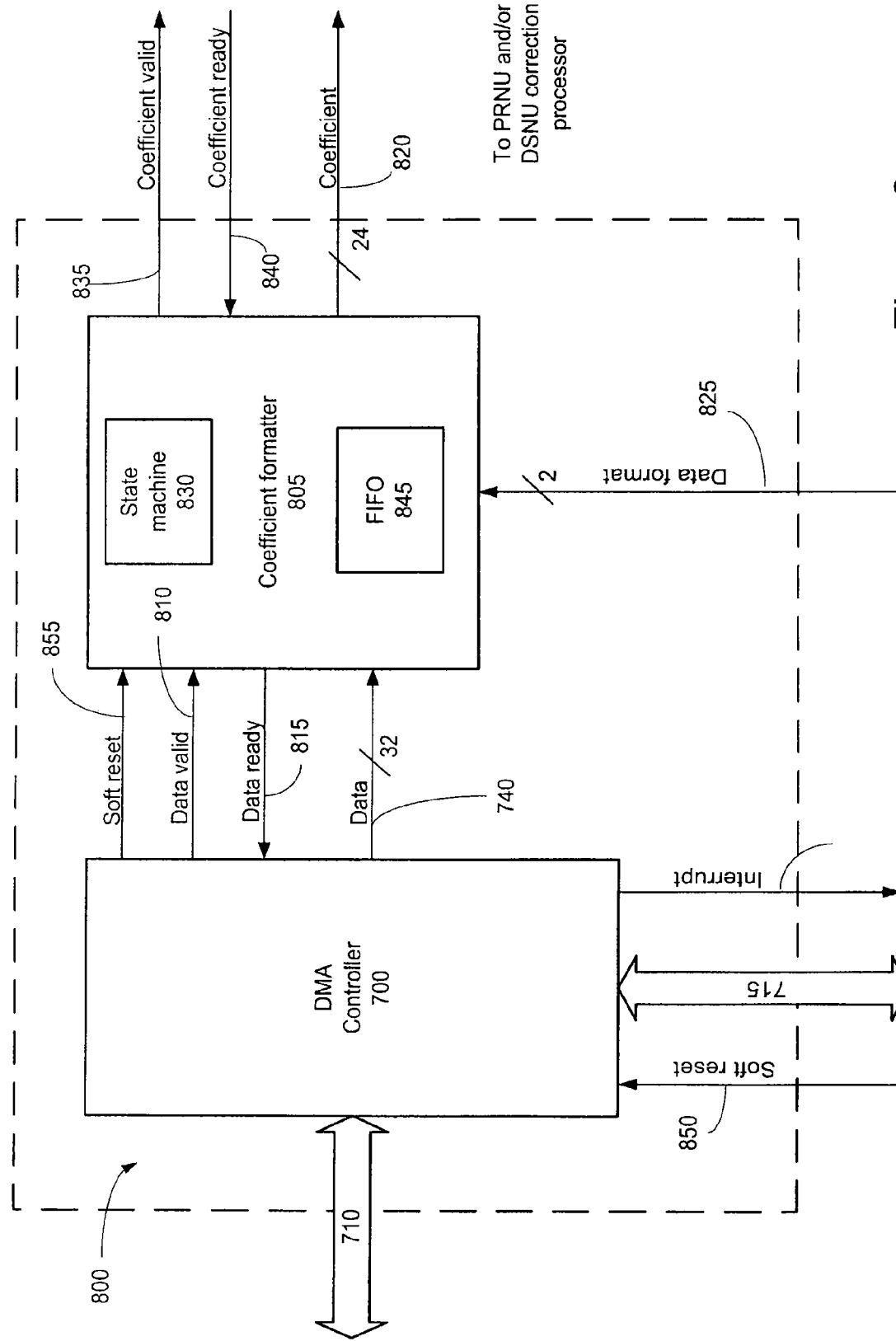
FIG. 8 is a schematic block diagram illustrating a system that employs the DMA controller shown in FIG. 7.

FIG. 8 is a schematic block diagram of a system 800 that may employ the DMA controller 700 shown in FIG. 7. In this example, system 800 is a lookup table system that may be employed to access and properly format photo response non-uniformity (PRNU) coefficients and/or dark signal non-uniformity (DSNU) coefficients associated with an image sensor. Such coefficients are used to process images acquired in scanners, cameras, fax machines, and the like.

The embodiment of the system 800 shown in FIG. 8 includes a coefficient formatter 805 that is connected for cooperation with the DMA controller 700. Although the DMA controller 700 and the coefficient formatter 805 may be implemented as separate units, they are implemented as a single integrated circuit in the illustrated embodiment, as designated by the broken line encompassing both components.

In operation, the DMA controller 700 reads packed coefficient data from memory (not shown in FIG. 8). The coefficient data memory may be off-chip memory, on-chip memory integrated into the system 800, etc. The packed coefficient data may be accessed by the DMA controller 700 as 32-bit words. These 32-bit words are passed along in this packed format to the input of the coefficient formatter 805 via data bus/lines 740. One or more data valid signals 810 and data ready signals 815 may be used by the DMA controller 700 and coefficient formatter 805 as handshaking signals that facilitate transfer of the packed data to the coefficient formatter 805.

The coefficient formatter 805 takes the 32-bit packed data and executes an unpacking operation to place the coefficient data at lines 820 in the proper format for use by a PRNU and/or DSNU correction processor (not shown). The format used by the coefficient formatter 805 to unpack the data is determined by the state of the signals on the data format selection lines 825. The illustrated embodiment employs two data format selection lines 825 allowing selection from one of four data formats. Common data width formats include 12-bits, 16-bits, 20-bits, and 24-bits. Consequently, the coefficient formatter 805 takes the 32-bit packed coefficient data and unpacks the data so that each coefficient provided to the correction processor has a width of 12, 16, 20, or 24-bits, depending on the state of the data format selection lines 825.

A state machine 830 is used to control the flow of packed coefficient data from the DMA controller 700 as well as the flow of unpacked coefficient data to the correction processor. One or more coefficient valid signals 835 and one or more coefficient ready signals 840 may be used by the coefficient formatter 805 and the correction processor in a bidirectional handshake process to facilitate transfer of the coefficient data from the coefficient formatter 805 to the correction processor. In the illustrated embodiment, data transfers to and from the coefficient formatter 805 take place using a FIFO 845.

The state machine 830 may operate in three states—load data, shift data, and idle. To this end, a counter may be incorporated in the state machine 830 to indicate how many valid nibbles are in the FIFO 845. This count may be used by the state machine 830 to generate signals indicative of whether or not the FIFO 845 has room for incoming data and if there is sufficient data to transfer an unpacked coefficient. The state machine 830 uses these signals to determine whether the FIFO 830 should operate in the shift data state or the load data state.

System 800 may be set to an initial, known state in response to activation of the soft reset signal 850. Placing this bit in an active state will cause the DMA controller 700 to cease further direct memory access transfers and discard unprocessed buffer data. Additionally, the various programmable registers of the DMA controller 700 may be placed in known states. In response to the soft reset signal 850, DMA controller 700 may provide a corresponding soft reset signal 855 to the coefficient formatter 805. Assertion of the soft reset signal 855 returns the state machine 830 and FIFO 845 to known states.

Figure 9:
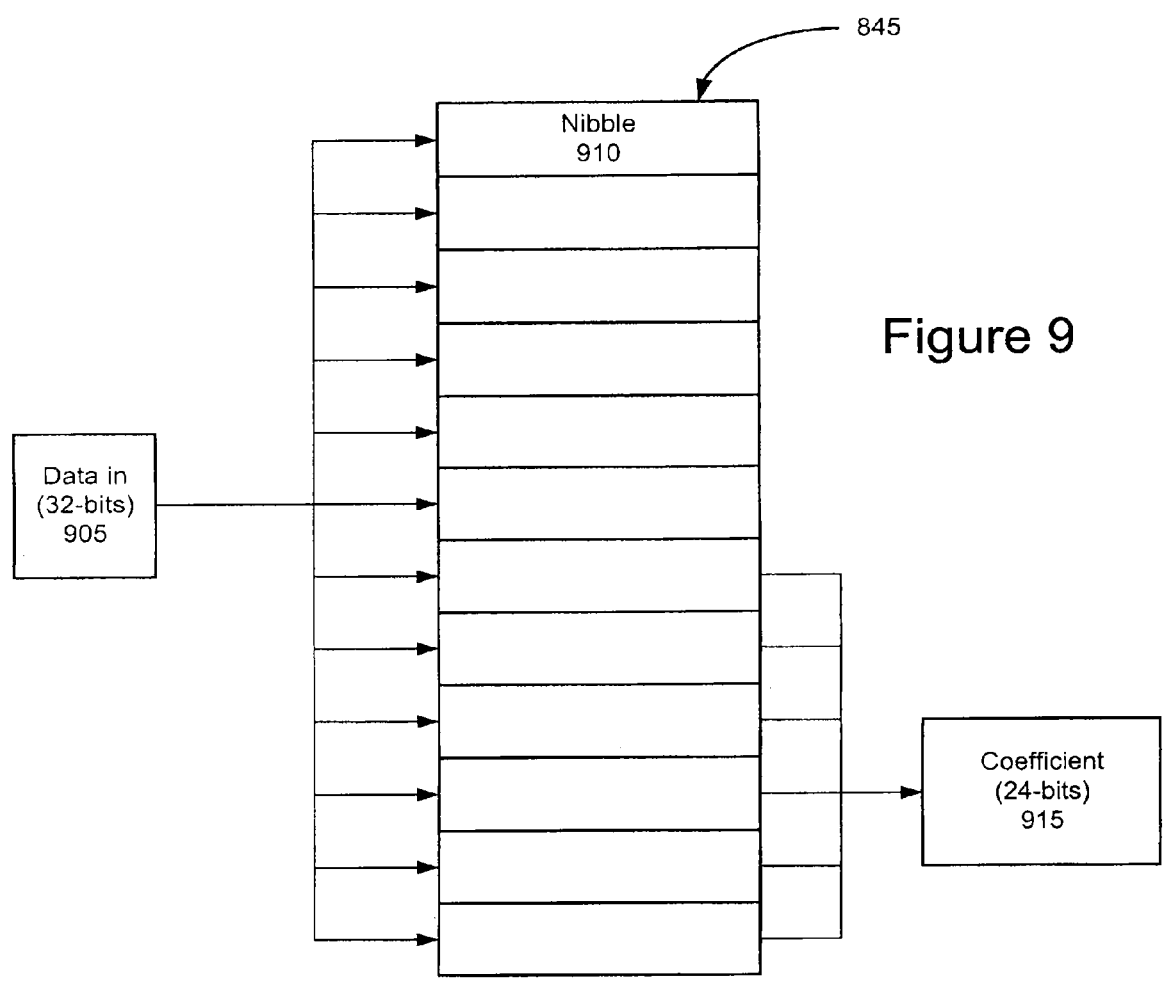
FIG. 9 illustrates FIFO access to a coefficient in the system shown in FIG. 8 when the selected coefficient width is 24-bits.

FIG. 9 illustrates one manner in which FIFO 845 may be organized as the state machine 830 loads and unloads data. As shown, packed data 905 is received at the buffer input with a width of 32-bits. The bits of the packed data 905 are stored and organized as nibbles 910 in the FIFO 845 during a data load operation. During a data read operation, the requisite number of nibbles 910 are read from the FIFO 845 to generate unpacked coefficient data having the correct width. For example, if the data format selection signals 825 direct the coefficient formatter 805 to provide the correction processor with coefficients having a width of 12-bits, then three consecutive nibbles 910 will be provided to the coefficient data output lines 820 during each read operation. Similarly, if the data format selection signals 825 direct the coefficient formatter 805 to provide the correction processor with coefficients having a width of 24-bits, then six consecutive nibbles 910 will be provided to the coefficient data output lines 820 during each read operation. FIG. 9 illustrates FIFO access to a coefficient 915 when the selected coefficient width is 24-bits.

Figure 10:
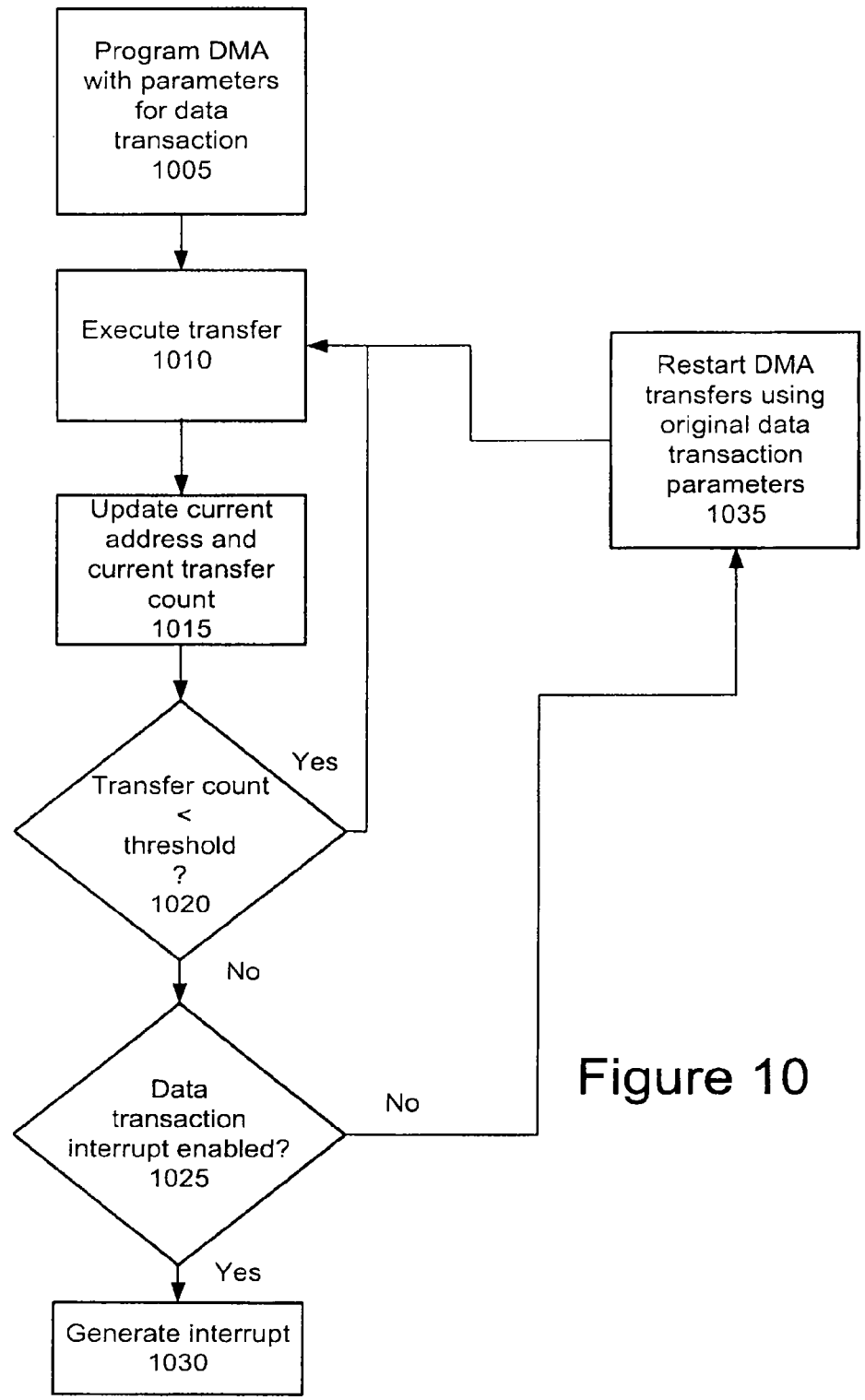
FIG. 10 is a flowchart illustrating a plurality of interrelated operations that may be executed by any of the DMA controllers shown in FIGS. 1, 3, 4, 5, 7, and 8.

FIG. 10 is a flowchart showing a plurality of interrelated operations that may be used to operate one or more of the foregoing DMA controllers. As shown, the DMA controller is programmed with the parameters that define a complete data transaction at block 1005. Execution of the data transfers of the data transaction start at block 1010. With each transfer, the current address and current transfer count are updated at block 1015. A check is made at block 1020 to determine whether the transfer count is below a threshold value corresponding to the parameters programmed at block 1005. If the transfer count is below this threshold, all transfers for the data transaction have not been completed and control returns to block 1010 for execution of another data transfer. If the check at block 1020 determines that all transfers for the data transaction have been completed, a further check is made at block 1025 to determine whether the data transaction interrupt is enabled. If the data transaction interrupt is enabled, the DMA controller generates a data transaction complete interrupt at block 1030 and no further transfers take place without, for example, processor intervention. However, if the data transaction interrupt is not enabled, DMA transfers are restarted at block 1035 using the original data transaction parameters and the DMA controller automatically begins re-executing another data transaction at block 1010. Automatic repetition of the data transaction may continue until the transaction is stopped by, for example, the occurrence of a soft reset, hard reset, external interrupt, software generated interrupt, disabling of the DMA engine, or the like.

It is intended that the foregoing detailed description be understood as an illustration of selected forms that the invention can take and not as a definition of the invention. It is only the following claims, including all equivalents, that are intended to define the scope of this invention.

What is claimed is:

1. A direct memory access controller comprising:
 a first programmable register configured to store a first value, wherein the first value defines a start address of a single data transaction;
 a second programmable register configured to store a second value that is different than the first value, wherein the first value and the second value together define a beginning and an end of a block of data, respectively, to be transferred;
 a third programmable register configured to store a third value that is different than the first value and the second value, wherein the third value is utilized to determine whether to continue to repeatedly transfer the block of data;
 first, second, and third temporary registers;
 restart logic configured to reset values of the first, second, and third temporary registers to the first, second, and third values in the first, second, and third programmable registers, respectively; and
 transfer control circuitry configured to repeatedly transfer the block of data defined by the first and second temporary registers to a destination address until the third value indicates that the repeated transfer of the block of data should cease.

2. The direct memory access controller of claim 1, wherein the second value comprises a transfer count indicative of a total number of data transfers that are to be executed by the transfer control circuitry during the single data transaction.

3. The direct memory access controller of claim 1, wherein the second value comprises an end address location value corresponding to an address of a memory location at which the transfer control circuitry is to cease data transfers for the single data transaction.

4. The direct memory access controller of claim 1, further comprising a decrementor circuit adapted to reduce the value of the second temporary register in response to execution of a data transfer by the transfer control circuitry.

5. The direct memory access controller of claim 1, further comprising programming circuitry adapted to facilitate external programming of the transfer control circuitry.

6. The direct memory access controller of claim 5, wherein the programming circuitry is configured to facilitate programming of the transfer control circuitry to execute data transfers between data memory and a data formatter.

7. The direct memory access controller of claim 1, wherein the third value corresponds to a transaction count and the transfer control circuitry is configured to transfer the data defined by the first and second temporary registers to the destination address a number of times equal to the transaction count.

8. A data processing system comprising:
 a storage device that stores data to be processed; and
 a direct memory access controller for transferring at least some data in the storage device to a destination address, the direct memory access controller comprising:

a first programmable register that stores a first value, wherein the first value defines a start address;

a second programmable register that stores a second value that is different than the first value, wherein the first value and the second value define a beginning and an end of a block of data, respectively, to be transferred;

a third programmable register configured to store a third value that is different than the first value and the second value, wherein the third value is utilized to determine whether to continue to repeatedly transfer the block of data;

first, second, and third temporary registers;

restart logic configured to reset values of the first, second, and third temporary registers to the first, second, and third values in the first, second, and third programmable registers, respectively; and transfer control circuitry configured to repeatedly transfer the block of data defined by the first and second temporary registers to a destination address until the third value indicates that the repeated transfer of the block of data should cease.

9. The data processing system of claim 8, wherein the second value in comprises a transfer count indicative of a total number of data transfers that are to be executed by the transfer control circuitry during a single data transaction.

10. The data processing system of claim 8, wherein the second value stored comprises an end address location value corresponding to an address of a memory location at which the transfer control circuitry is to cease data transfers for the single data transaction.

11. The data processing system of claim 8, wherein the direct memory access controller comprises a decrementor circuit adapted to reduce the value of the second temporary register in response to execution of a data transfer by the transfer control circuitry.

12. The data processing system of claim 8, wherein the direct memory access controller comprises programming circuitry adapted to facilitate external programming of the transfer control circuitry.

13. The data processing system of claim 12, wherein the programming circuitry facilitates programming of the transfer control circuitry to execute data transfers between data memory and a data formatter.

14. The data processing system of claim 8, wherein the third value corresponds to a transaction count and the transfer control circuitry is configured to transfer the data defined by the first and second temporary registers to the destination address a number of times equal to the transaction count.

15. A method for transferring data from a source address to a destination address, the method comprising:

programming a first programmable register of a direct memory access controller (DMAC) with a first value, wherein the first value defines a start address;

programming a second programmable register of the DMAC with a second value that is different than the first value, wherein the first value and the second value define a beginning and an end of a block of data, respectively, to be transferred; and programming a third programmable register of the DMAC with a third value that is different than the first value and the second value, wherein the third value is utilized to determine whether to repeatedly transfer the block of data;

transferring, by the DMAC, the first, second, and third values—to first, second, and third temporary registers, respectively; and repeatedly transferring the block of data defined by the first and second temporary registers to a destination address until the third value indicates that the repeated transfer of the block of data should cease.

16. The method of claim 15, wherein the second value stored comprises a transfer count indicative of a total number of data transfers that are to be executed by the DMAC during a single data transaction.

17. The method of claim 15, wherein the second value comprises an end address location value corresponding to an address of a memory location at which data transfers for a single data transaction are to cease.

18. The method of claim 15, wherein the DMAC is configured to reduce the value of the second temporary register while transferring data to the destination address.

19. The method of claim 15, wherein the DMAC is programmed via external programming circuitry.

20. The method of claim 15, wherein the DMAC is configured to transfer data between a memory and a data formatter.

* * * * *